(12) United States Patent
Humble et al.

(10) Patent No.: US 11,499,627 B2
(45) Date of Patent: Nov. 15, 2022

(54) ADVANCED VEHICLE TRANSMISSION CONTROL UNIT BASED ON CONTEXT

(71) Applicant: INTERNATIONAL BUSINESS MACHINES CORPORATION, Armonk, NY (US)

(72) Inventors: James Humble, Hartsdale, NY (US); James R. Kozloski, New Fairfield, CT (US); Clifford A. Pickover, Yorktown Heights, NY (US); Tim Rumbell, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/004,526

(22) Filed: Jun. 11, 2018

(65) Prior Publication Data
US 2019/0376598 A1    Dec. 12, 2019

(51) Int. Cl.
*F16H 61/02*    (2006.01)
*G05D 1/00*    (2006.01)
*F16H 59/66*    (2006.01)
*F16H 59/60*    (2006.01)

(52) U.S. Cl.
CPC ....... *F16H 61/0213* (2013.01); *G05D 1/0088* (2013.01); *F16H 59/66* (2013.01); *F16H 2059/605* (2013.01); *F16H 2059/663* (2013.01); *F16H 2059/666* (2013.01)

(58) Field of Classification Search
CPC ........... F16H 61/0213; F16H 59/66; F16H 2059/605; F16H 2059/663; F16H 2059/666; G05D 1/0088

USPC .......................................................... 701/25
See application file for complete search history.

(56) References Cited

U.S. PATENT DOCUMENTS

| | | | |
|---|---|---|---|
| 4,862,363 A * | 8/1989 | Krisher | B60R 16/0373 701/59 |
| 6,289,332 B2 * | 9/2001 | Menig | B60K 35/00 180/167 |
| 6,351,698 B1 * | 2/2002 | Kubota | G01C 21/3608 704/E15.045 |
| 7,962,268 B2 * | 6/2011 | Cho | F16H 59/0204 477/78 |
| 2006/0216675 A1 * | 9/2006 | Ruttiger | F16H 63/42 434/71 |
| 2008/0070197 A1 * | 3/2008 | Yu | G09B 9/04 434/62 |
| 2008/0293540 A1 * | 11/2008 | Cho | F16H 59/0204 477/78 |
| 2012/0083976 A1 | 4/2012 | Fleming et al. | |
| 2013/0297106 A1 | 11/2013 | Yamazaki et al. | |
| 2014/0365085 A1 | 12/2014 | Fujii et al. | |
| 2015/0345622 A1 | 12/2015 | Sujan | |

(Continued)

*Primary Examiner* — Jess Whittington
*Assistant Examiner* — Terry C Buse
(74) *Attorney, Agent, or Firm* — Cantor Colburn LLP; Stosch Sabo

(57) ABSTRACT

Techniques related to vehicle operation. A processor determines that at least one condition is met related to a vehicle. In response to the at least one condition being met, the processor generates a natural language output having a query. The processor determines that an affirmative response to the query is received and causes a downshift of a transmission of the vehicle in response to the affirmative response.

20 Claims, 7 Drawing Sheets

(56) References Cited

U.S. PATENT DOCUMENTS

2017/0344023 A1* 11/2017 Laubinger ................ G08G 1/22
2018/0238701 A1*  8/2018 Liebinger .......... G01C 21/3626
2019/0168753 A1*  6/2019 Borhan .................. F02D 29/02
2019/0220010 A1*  7/2019 Leonard ................ B60W 50/14

* cited by examiner

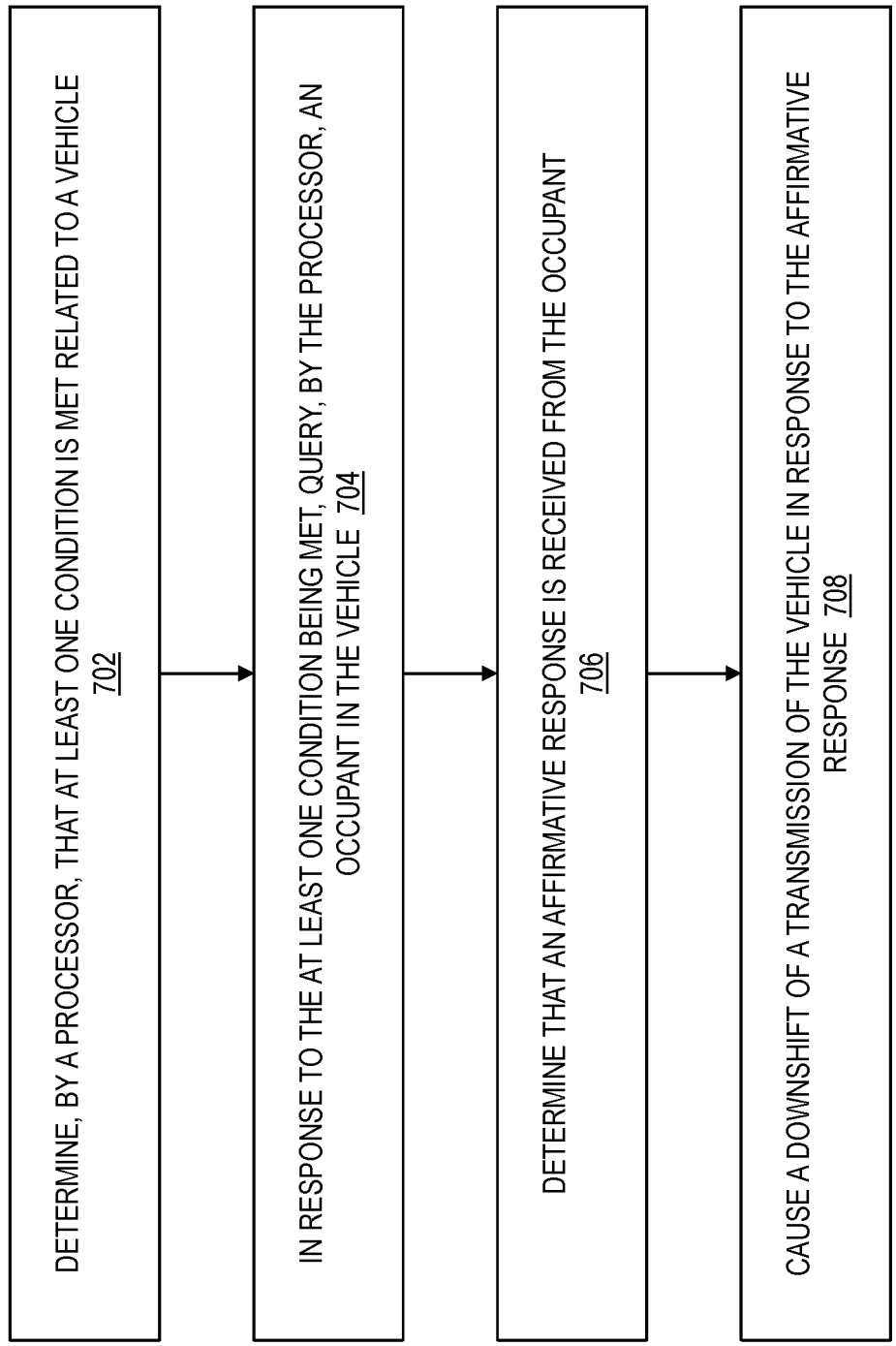

ADVANCED VEHICLE TRANSMISSION CONTROL UNIT BASED ON CONTEXT

BACKGROUND

The present invention relates in general to transmission vehicle operations, and more specifically, to an advanced vehicle transmission control unit based on context.

A transmission is a machine in a power transmission system, which provides controlled application of the power. Often the term transmission refers simply to the gearbox that uses gears and gear trains to provide speed and torque conversions from a rotating power source to another device. Additionally, the term transmission can refer to the whole drivetrain, including clutch, gearbox, prop shaft (for rear-wheel drive), differential, and final driveshafts. In motor vehicles, the transmission adapts the output of the internal combustion engine to the drive wheels. Such engines need to operate at a relatively high rotational speed, which is inappropriate for starting, stopping, and slower travel. The transmission reduces the higher engine speed to the slower wheel speed, increasing torque in the process. Typically, a transmission has multiple gear ratios (or simply "gears") with the ability to switch between them as speed varies. This switching can be done manually (by the operator) or automatically. In motor vehicles, the transmission generally is connected to the engine crankshaft via a flywheel or clutch or fluid coupling, partly because internal combustion engines cannot run below a particular speed. The output of the transmission is transmitted via the driveshaft to one or more differentials, which drive the wheels.

SUMMARY

Embodiments of the invention are directed to a computer-implemented method for vehicle operation. A non-limiting example of the computer-implemented method includes determining, by a processor, that at least one condition is met related to a vehicle, and in response to the at least one condition being met, generating, by the processor, a natural language output including a query. Also, the method includes determining, by the processor, that an affirmative response to the query is received, and causing a downshift of a transmission of the vehicle in response to the affirmative response.

Embodiments of the invention are directed to a computer program product that includes a computer storage medium having program instructions embodied therewith, the program instructions executable by a processor to cause the processor to perform operations. A non-limiting example of the operations include determining, by the processor, that at least one condition is met related to a vehicle, and in response to the at least one condition being met, generating, by the processor, a natural language output comprising a query. Also, the operations include determining, by the processor, that an affirmative response to the query is received, and causing a downshift of a transmission of the vehicle in response to the affirmative response.

Embodiments of the invention are directed to a system for vehicle operation. The system can include a processor and a computer readable storage medium having executable instructions that, when executed by the processor, cause the processor to perform operations. A non-limiting example of the operations include determining, by the processor, that at least one condition is met related to a vehicle, and in response to the at least one condition being met, generating, by the processor, a natural language output comprising a query. Also, the operations include determining, by the processor, that an affirmative response to the query is received, and causing a downshift of a transmission of the vehicle in response to the affirmative response.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 7 is a flowchart of a computer-implemented method for vehicle operation according to embodiments of the present invention.

Figure 1:
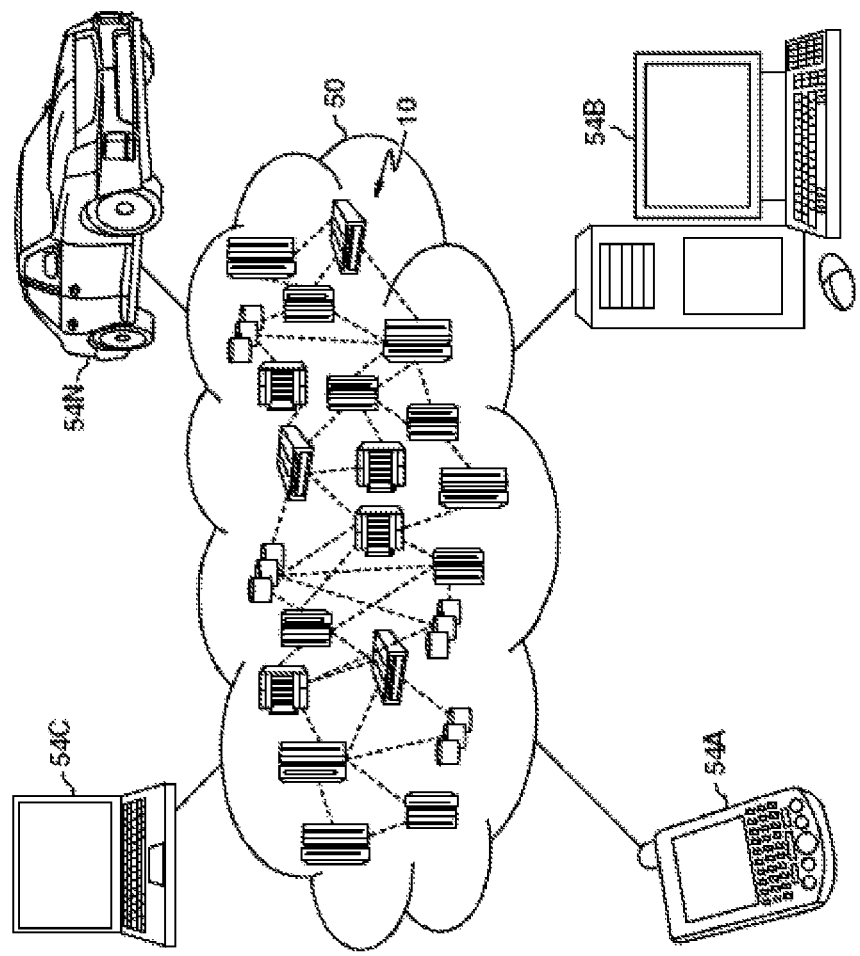
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the exemplary embodiments of the present invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in instances of downshifting for a transmission, a human driver exploits of a model of future driving conditions in order to determine when to downshift. Automatic transmissions, however, are constrained to using the existing road and driving conditions only to determine when to change gears. While today's automatic transmissions do downshift, they do so only in the most basic conditions (e.g., when brakes are applied by the human driver when going downhill). An autonomous vehicle or self-driving car (SDC) can exploit many of the existing technology of automatic transmissions, but to give rise to the "feeling" of a manual transmission driver, the SDC will need to make use of more sophisticated anticipation of road conditions, and driver intent, in order to downshift appropriately.

Turning now to an overview of the aspects of the invention, one or more embodiments of the present invention provide methods and systems for an advanced vehicle transmission control unit that operates based on context. The vehicle transmission control unit has and utilizes access to (potential) trigger information about future estimated path characteristics, such as, for example, truck driver ahead (e.g., tractor trailer truck), slope of rode predefined time (e.g., 3 seconds) in future, sharpness of curve, stop light, etc., which can be based on GPS coordinates, maps, forward facing cameras, information from earlier vehicles on the same route/road, etc. Also, based on the trigger information being met (i.e., the trigger condition being met), the occupant is queried regarding whether he/she would like a transmission characteristics change, such as a downshift (or an upshift in certain cases). The nature of the query can depend on passenger cohort.

It is to be understood that although this description includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): a software distribution model in which a third-party provider hosts applications and makes them available to customers over the Internet. SaaS removes the need for organizations to install and run applications on their own computers or in their own data centers. This eliminates the expense of hardware acquisition, provisioning and maintenance, as well as software licensing, installation and support.

Platform as a Service (PaaS): a cloud-computing model that delivers applications over the Internet. In a PaaS model, a cloud provider delivers hardware and software tools, for example, tools needed for application development, to users as a service. A PaaS provider can host the hardware and software on the PaaS provider's infrastructure. As a result, PaaS frees users from having to install in-house hardware and software to develop or run a new application.

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems may include monitoring engines to track performance and usage, error monitoring, and data analysis engines.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure that includes a network of interconnected nodes.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile onboard computer system 54N may communicate. Computing node 10 can include any elements discussed in FIG. 6. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
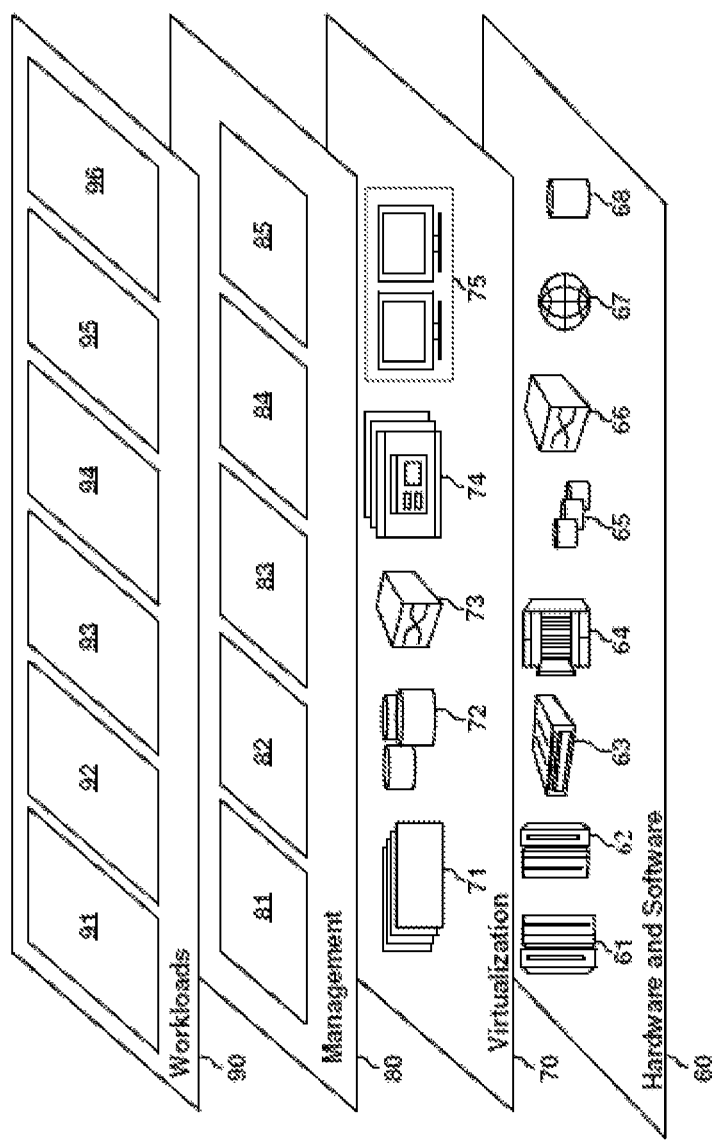
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and database 96. The database 96 can include driving characteristics of various vehicles and passenger cohort for various passengers in the vehicles.

Figure 3:
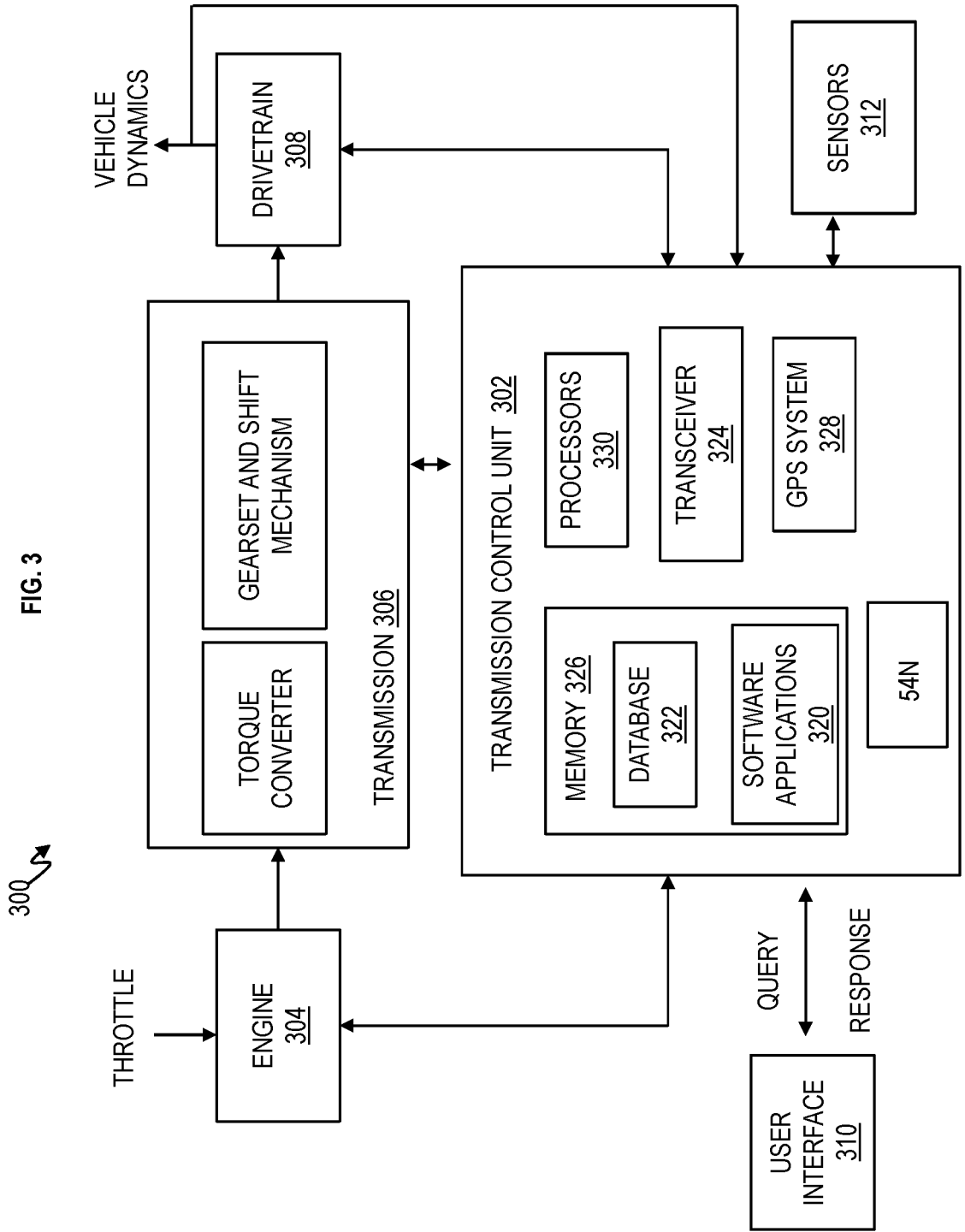
FIG. 3 depicts a block diagram illustrating an advanced vehicle transmission control unit for a vehicle according to one or more embodiments of the present invention.

FIG. 3 depicts a block diagram illustrating an advanced vehicle transmission control unit 302 for a vehicle 300 in accordance with embodiments of the present invention. The vehicle 300 can be an autonomous vehicle (also referred to as a self-driving car), human driven vehicle, and/or combination of both. Autonomous driving refers to vehicles in which operation occurs with little to no direct driver input to control the steering, acceleration, and braking of the vehicle. Autonomous vehicles are designed so that the driver is not expected to constantly monitor the roadway during autonomous driving operation. Autonomous vehicles can be based on varying degrees of automation, i.e., conditional automation to full automation.

Furthermore, autonomous vehicles are automobiles that have the ability to operate and navigate without human input. Thus, the transmission in an autonomous vehicle is automatically controlled a configuration of systems that include sensors, such as radio detection and ranging (RADAR), light detection and ranging (LIDAR), global positioning systems, and computer vision to detect the vehicle's surroundings. Advanced computer control systems interpret the sensory input information to identify appropriate navigation paths, as well as obstacles and relevant signage. Some autonomous vehicles update map information in real time to remain aware of the autonomous vehicle's location even if conditions change or the vehicle enters an uncharted environment. Autonomous vehicles increasingly communicate with remote computer systems via wireless network connections and with one another using dedicated short-range communications (DSRC).

One skilled in the art understands that the functions of a vehicle typically include engine, a fuel system, an electrical system, an exhaust system, a drivetrain (sometimes combined with the transmission, suspension and steering systems), a brake system, etc. In the example described in FIG. 3, some details are omitted for the sake of brevity but it is understood that the vehicle transmission control unit 302 operates in a fully functioning vehicle 300, as understood by one skilled in the art.

The transmission control unit 302 communicates with the engine 304, transmission system 306, the drivetrain 308, a user interface 310, and one or more sensors 312. The transmission system 306 can include a torque converter and a gearset shift mechanism, as understood by one skilled in the art. The user interface 310 can include speakers, a touch screen display, a keyboard, a toggle switch, microphones, cameras in the car (to read gestures, lips, facial expressions, etc., of the occupant), etc. The transmission control unit 302 and/or the vehicle 300 can represent and include functionality of the automobile onboard computer system 54N.

The transmission control unit 302 includes one or more software applications 320 in memory 326 executable on processors 330. The software applications 320 are configured to use and retrieve (potential) trigger information from anywhere. For example, the trigger information used by the software application 320 can include information from the database 322, signals from sensors 312, input (e.g., via a passenger) from the user interface 310, and data received via transceiver 324 (e.g., over a wireless communication link), feedback from vehicle dynamics (drivetrain 308), signals from other vehicles B_1 to B_N (depicted in FIG. 5), information from server 550 (depicted in FIG. 5), GPS signals from satellite 530 (depicted in FIG. 5), etc., to control the downshifting (and/or upshifting) of the transmission 306. Downshifting is changing the gear in the transmission 306 from a higher gear to a lower gear. Conversely, upshifting is changing the gear from a lower gear to a higher gear. The software application 320 can also communicate with database 96, and retrieve trigger information and passenger cohort information from database 96, which can then be stored locally in database 322.

The advanced transmission control unit 302 can use information of future estimated path characteristics, which can include information of road condition monitors (e.g., signals received via transceiver 324), information of global positioning system (GPS) 328 (e.g., GPS signals received via transceiver 324), map and terrain information (e.g., stored in database 322 and/or received via transceiver 324), information forward facing cameras (e.g., one or more sensors 312), etc., to infer when a downshift is desirable for a passenger in a SDC. The software application 320 of the transmission control unit 302 processes this trigger information of future estimated path characteristics in order to control the downshifting of the transmission 306 of the vehicle 300.

Figure 4:
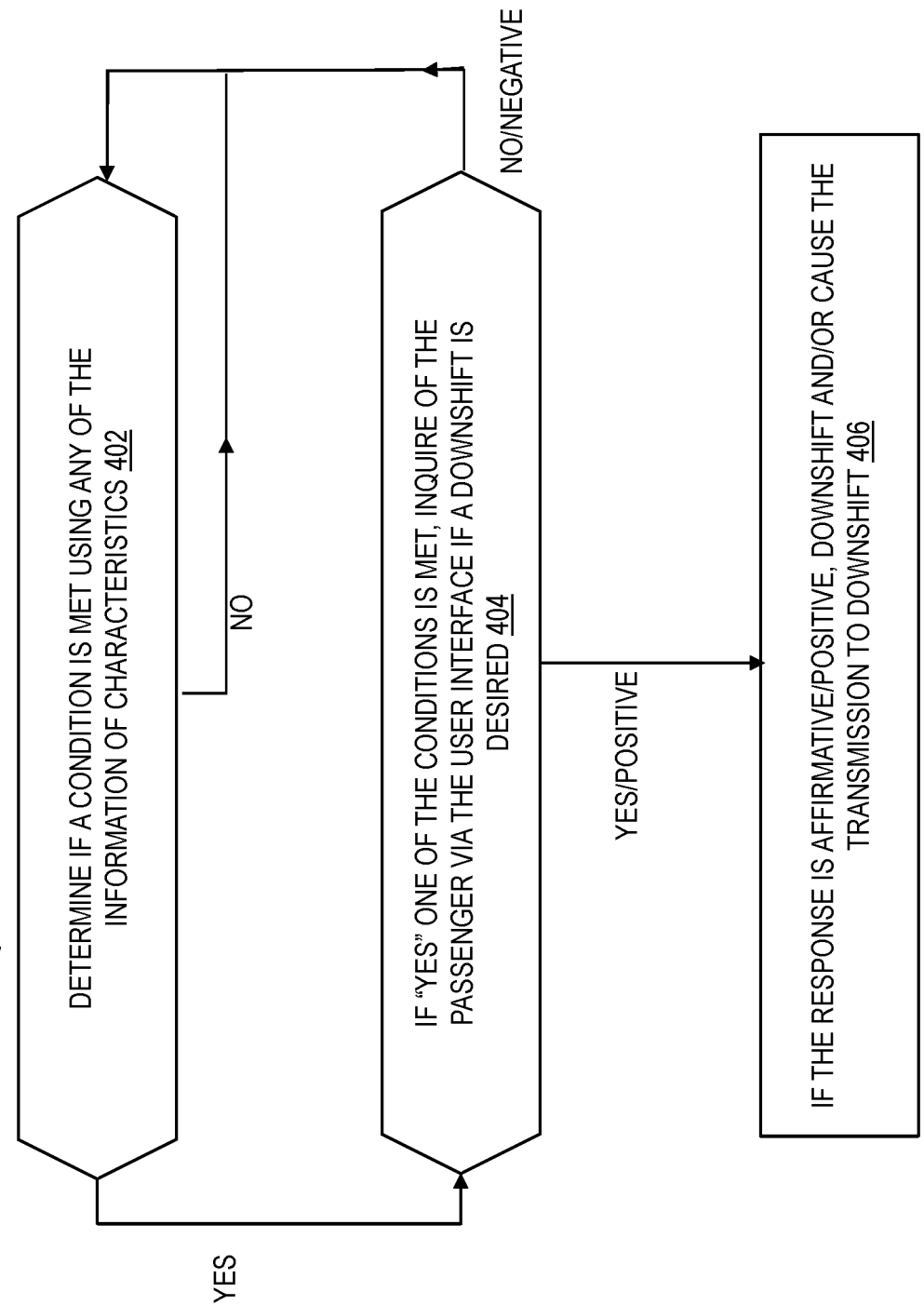
FIG. 4 depicts a flowchart of a process for controlling the transmission of a vehicle according to one or more embodiments of the present invention.

FIG. 4 depicts a flowchart of a process 400 for controlling the transmission 306 of the vehicle 300 according to embodiments of the present invention. At block 402, the transmission control unit 302 is configured to determine if a condition is met using any of the trigger information of future estimated path characteristics. If "no" the condition of the trigger information is not met, the transmission control unit 302 continues to monitor for a condition. Example conditions of the trigger information can include determining that the road is sloping upwards, road is sloping downwards, a stop light is ahead, the vehicle 300 is overtaking another vehicle, a vehicle is tailgating, an upcoming and/or present change in road material and driving surface, upcoming and/or present change in road slipperiness, upcoming and/or present traffic, upcoming and/or present weather, upcoming and/present cornering around a curve, upcoming and/or present intersection, history of accidents, history of slipping, upcoming red light, etc.

If "yes" one of the conditions is met, the transmission control unit 302 is configured to inquire of or query the passenger via the user interface 310 if a downshift is desired at block 404. For example, the transmission control unit 302 is configured to audibly via speakers of the user interface 310 and/or in text via a display of the user interface 310 ask the passenger do you want a downshift. The transmission control unit 302 is configured to transform the met condition into a question for the occupant of the vehicle. For example, the form can be [condition] and [question] or vice versa. For explanation purposes, a few example questions are provided below, and the transmission control unit 302 can indicate any of the following. "The road is sloping upwards. Do you want to downshift?" "The road is sloping downwards. Do you want to upshift?" "You are approaching a stop light ahead. Do you want to downshift?" "You are about to overtake or pass another vehicle. Do you want to downshift?" "A vehicle is tailgating. Do you want to downshift?" "The road material and/or driving surface has changed or is about to change. Do you want to downshift?" "The road is slippery and will be slippery. Do you want to downshift?" "Traffic is slowing down. Do you want to downshift?" "The inclement weather is present or approaching. Do you want to downshift?" "You are approaching or in a curve. Do you want to downshift?" "You are approaching an intersection. Do you want to downshift?" "There has been a history of accidents on this segment of the road you are travelling. Do you want to downshift?" "There has been a history of slipping on this segment of the road. Do you want to downshift?" "You are approaching a traffic light. Do you want to downshift?"

If response from the occupant is "no" or a negative response, the transmission control unit 302 continues to monitor for a condition. If "yes" or affirmative response, the transmission control unit 302 is configured to downshift and/or cause the transmission 306 to downshift at block 406. The transmission control unit 302 can signal a downshift command signal to the transmission 306. The trigger condition can be asked to the occupant of the vehicle in the form of a question, such that any affirmative response or negative response can be recognized by a microphone of the user interface 310, in-car cameras (e.g., one or more sensors 312), touch screen of the user interface 310, camera of the user interface 310, etc.

For ease of understanding, various example scenarios are illustrated. A common behavior of human drivers of cars with a manual transmission is downshifting. Using a lower gear while traveling up a hill, traveling down a hill, cornering, accelerating rapidly, and/or coming to a planned stop is part of the excitement of owning a manual transmission for many drivers. For slowing, the lower gear uses the transmission's resistance to slow the vehicle, rather than friction applied to the turning wheel (e.g., disc brakes). This form of slowing has different properties than braking, and when planned and executed effectively, can make for a safer ride, speedier ride, etc. When accelerating rapidly, the use of lower gear for a short burst can be quite effective.

For the query/inquiry to the occupant via the user interface 310 (e.g., block 404 in FIG. 4), the transmission control unit 302 is configured to a natural language interface with the passenger of the SDC (e.g., vehicle 300). By having the downshift capability discussed herein, the SDC is able to provide a passenger with the "thrill" of deciding to downshift by inquiring of the passenger if a downshift is desired. For example, Tim is a passenger in a self-driving sports car (e.g., vehicle 300), which is designed for good acceleration. In an example scenario, Tim's vehicle 300 is behind a slow-moving construction vehicle at night on a two-lane highway with a broken centerline. The vehicle 300 determines it is safe to overtake the dump truck, but to make Tim "feel better" before crossing the centerline, the transmission control unit 302 of the self-driving vehicle 300 inquires through a natural language interface, "Tim, I'm about to pass the truck. Should I downshift?" Tim replies "Yes". Accordingly, the sports car crosses the centerline and downshifts (to a lower gear in the transmission 306) to accelerate rapidly past the dump truck and return more quickly back to the travel lane. This makes Tim feel more secure, even though no oncoming car was present.

As discussed herein, the transmission control unit 302 is configured to engage the passenger (who can be sitting behind the wheel of a self-driving vehicle and/or in another seat) in a "conversation" about when to downshift, as in the example of overtaking a truck. Also, for overtaking a truck, this is not the same as future roadway information in the state-of-the-art. Rather, embodiments of the invention allow the occupant to instruct the vehicle to downshift and/or not to downshift the transmission 306 via the transmission control unit 302 in response to an inquiry/query by the transmission control unit 302. This allows what is colloquially referred to as "back seat driving" in an SDC, and could permit occupants to tell the SDC how to drive for short bursts.

The transmission control unit 302 can utilize or include chatbots. A chatbot (also known as a talkbot, chatterbot, Bot, IM bot, interactive agent, or artificial conversational entity) is a computer program or an artificial intelligence system that conducts a conversation via auditory natural language or textual methods. Such programs are often designed to convincingly simulate how a human would behave as a conversational partner, thereby passing the Turing test. In one example, chatbots can be included in and/or employed by one or more software application 320 of the transmission control unit 302 for communicating with the occupant in the vehicle. Chatbots can be tailored to different cohorts of passengers in the SDC so that questions and interactions are natural and understandable. Chatbots can also be employed with varying personalities, thereby making the vehicle 300 (e.g., car) fun to use such that users will enjoy it.

The transmission control unit 302 is configured to communicate with the database 96 to obtain passenger cohort, such that the transmission control unit 302 can ask questions (i.e., query/inquire) about a change in the transmission according to the preferences in the passenger cohort. Also, the passenger cohort can be stored locally in database 322. That is, based on trigger information/condition of future estimated path characteristics, the occupant is queried regarding whether he/she would like a transmission characteristics change. The passenger cohort is a user profile for passengers authorized to drive and/or use the vehicle 300. The passenger cohort knows or defines that passenger X would most likely want a downshift under trigger conditions, while passenger Y would most likely not want a downshift under trigger conditions. After a predefined number of responses, the passenger cohort can be utilized to instruct the transmission control unit 302 not to query passenger Y about a downshift, but to always query passenger X about a downshift. The nature of the query depends on passenger cohort.

Figure 5:
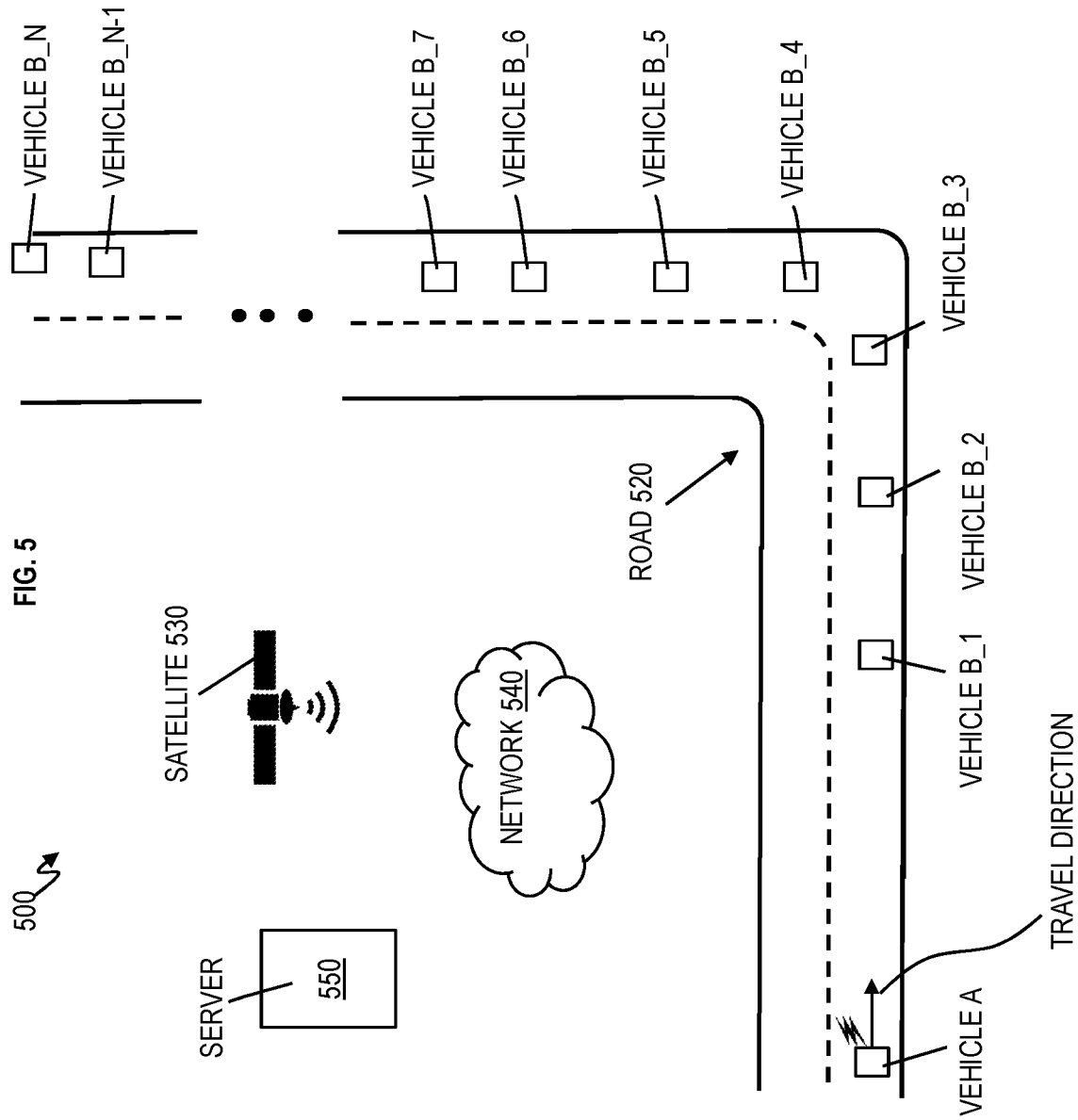
FIG. 5 depicts a system according to one or more embodiments of the present invention.

FIG. 5 depicts a system 500 according to embodiments of the invention. In this illustration, example vehicle A and vehicles B (delineated as vehicles B_1 to B_N where N is the last of the vehicles) can communicate with each other and can communicate with server 550 (e.g., computing node 10) which include databases 96. The example vehicle A and vehicles B can each include the transmission control unit 302 along with other elements in FIG. 3. For explanation purposes, vehicle A is represented as vehicle 300. Vehicle transmission database signaling can occur among the vehicle A (e.g., vehicle 300), vehicles B_1 to B_N, satellite 530, network 540, and server 550 in order to communicate as discussed herein. The server 550 can be, incorporate, represent, and/or include any of the following hardware components discussed in FIG. 2: mainframes 61, RISC architecture based servers 62, servers 63, blade servers 64, storage devices 65, and networks and networking components 66.

The transmission control unit 302 of, for example, vehicle A (e.g., vehicle 300) can query the transmission settings of (the transmission control unit 302 in) other vehicles B_1 to B_N of similar types that have travelled on the same region of road 520 under similar settings (for example, road conditions, time of day, weather). The transmission control unit 302 is configured to adjust (e.g., after querying the occupant and receiving an affirmative response) the transmission 306 of vehicle A (e.g., vehicle 300) to match/follow the transmission setting of one or more vehicles B_1 to B_N when the occupants of set {B_1 to B_N} had a favorable/safe ride, and avoid those transmission settings (one or more vehicles B_1 to B_N when the occupants of set {B_1 to B_N}) that produced an unfavorable/unsafe ride.

An unfavorable/unsafe ride can be defined as causing a vehicle to operate in an undesirable predefined manner, such as skidding/slipping, applying anti-block brakes (predefined to cause the occupants to abruptly launch forward/backward at a predefined speed), etc. The phrase similar type can refer to any of: size, weight, use of snow tires, number of passengers in car and their weight distributions, ride preferences, etc.

For vehicles B_1 to B_N travelling or having travelled on road 520 ahead of/prior to vehicle A (e.g., vehicle 300), this information of the transmission settings for an unfavorable/unsafe ride and/or a favorable/safe ride can be directly transmitted to transmission control unit 302 via transceiver 324, and/or stored in the database 96 of server 550 (e.g., computing node 10) to be subsequently transferred to the transmission control unit 302.

As noted herein, the trigger information received and utilized by the transmission control unit 302 can be future estimated characteristics which can include any of the following: upcoming road slope predefined time (e.g., 3, 10, 30 . . . 90, etc., seconds) in future, upcoming road material and driving surface in predefined time (e.g., 10, 20, 30 . . . 90, etc., seconds) in future, road slipperiness, traffic, weather, anticipated cornering around a curve or intersection, history of accidents, history of slipping, etc. For example, the trigger information can be that a truck driver is ahead, a steep slope of road is ahead, a sharp curve is ahead, a red light ahead, etc. The trigger information can be received by the advanced transmission control unit 302 in vehicle A (e.g., vehicle 300) from any sensors 312, database 322, GPS system 328, transceiver 324, vehicles B_1 to B_N, server 550 (e.g., having database 96 which collects trigger information), satellite 530, network 540, road monitors/sensors (not shown), etc. Because of any one or more of the conditions in trigger information being met, the transmission control unit 302 transmission characteristics can change the transmission 306 by downshifting and/or upshifting optionally after querying the occupant to receive an affirmative response (e.g., "yes" at block 406). Although examples discuss, querying whether the occupant desires a downshift, the transmission control unit 302 can query whether the occupant desires an upshift when the conditions of the trigger information are met and then upshift accordingly.

The software applications 320 are configured to learn effective use of gearing and proactive shifting (e.g., that avoids accidents, or slipping, with a consideration of road slope T=9 seconds in future). As noted herein, the vehicle 300 can be a self-driving car or autonomous vehicle. The transmission characteristics change (i.e., to downshift or upshift) can be for decreased accidents, increase safety, increased fuel efficiency, increased emotional well-being of driver, etc. The change of the transmission characteristics for the transmission 306 can optionally be indicated, e.g., by a light, a sound, a spoken synthesized voice, a vibration of steering wheel, etc. The transmission characteristics changing can take into consideration a planned specific route stored in a GPS device or phone-like device.

As noted above, the system 500 includes vehicle A (vehicle 300), vehicles B_1 to B_N, and server 550 (which can be one node 10) can all be interconnected over network 540. Network 540 can be, for example, a local area network (LAN), a wide area network (WAN), such as the Internet, a dedicated short range communications network, or any combination thereof, and can include wired, wireless, fiber optic, or any other connection known in the art. The communication network can be any combination of connections and protocols that will support communication between vehicle A (e.g., vehicle 300), vehicles B_1 to B_N, and node (server) 10, respectively. The system 500 can also include a plurality of global positioning satellites 530 that transmit signals to the vehicles A (vehicle 300), B_1 to B_N, server 550. The cloud computing environment 50 shown in FIG. 1 can supplement or implement any of the computer-based functionality of the system 500.

The vehicles A (e.g., vehicle 300), vehicles B_1 to vehicle B_N can be autonomous, semi-autonomous, partially manually operated or a combination thereof. The vehicles A (vehicle 300), vehicles B_1 to vehicle B_N can each include propulsion systems (not shown), control systems (not shown), user interfaces (not shown), automobile onboard computer systems 54N (see FIG. 1), sensor systems (not shown), and communications systems (not shown).

The propulsion systems can include components operable to provide powered motion to the vehicles. The propulsion systems can provide motion using a variety of sources, for example, an engine/motor. The engine/motor can be any combination of an internal combustion engine, an electric motor, or other types of engines/motors. The propulsion systems can include multiple types of engines and/or motors, such as, a gas-electric hybrid car. An energy source for the propulsion systems can be, for example, gasoline, diesel, other petroleum-based fuels, propane, hydrogen, other compressed gas-based fuels, ethanol, solar panels, and/or batteries.

The control systems include a variety of mechanical, electro-mechanical, and electronic systems that can be configured to control the operations of the vehicles. Control systems can each include a steering unit, a throttle, a brake unit, and/or a navigation system. The steering unit can be a mechanism that can control a heading and/or turning of the vehicles. The throttle can be configured to control an operating speed of the vehicles. The brake unit can include any combination of mechanisms configured to decelerate the vehicles. The navigation system can be any system configured to determine a driving path for the vehicles. For example, the navigation system can receive input information from a GPS satellite 530 and one or more camera systems included in the sensor systems in order to generate the driving path for the vehicles.

The user interfaces can be mechanisms by which an occupant of the vehicles can interact with the vehicles. The user interfaces can include buttons, knobs, levers, pedals, paddles, and/or any other type of user interface, such as a touchscreen display capable of detecting the location and/or movement of a user's finger.

The automobile onboard computer systems 54N, depicted in FIG. 1, are computing systems including at least one computer processor, which is capable of controlling one or more functions of the vehicles. For example, an automobile onboard computer system 54N can control a propulsion system based on inputs received from a sensor system.

The sensor systems can include any number of sensors configured to detect information about the vehicles and the vehicles' surrounding environments. The sensor systems can include a GPS, an inertial measurement unit (IMU), a RADAR unit, a LIDAR unit, and/or a camera. The GPS can be any sensor configured to estimate a geographic location. The IMU can be any combination of sensors configured to sense position and orientation changes in a vehicle based on inertial acceleration. The RADAR unit can be any system that uses radio signals to sense objects within the local environment of a vehicle. The RADAR unit can also detect relative motion between a vehicle and the vehicle's surroundings. The LIDAR unit can be any system configured to sense objects in a vehicle's environment using one or more lasers. The camera can include one or more devices configured to capture a plurality of images of the environment of a vehicle.

The communications systems can be any system configured to communicate with one or more devices directly or via network 540. The communications systems can include a transmitter and a receiver for sending and receiving messages.

The server 550 can be a desktop computer, a laptop computer, a tablet computer, a specialized computer server, a smartphone, or any other computer system known in the art.

Figure 6:
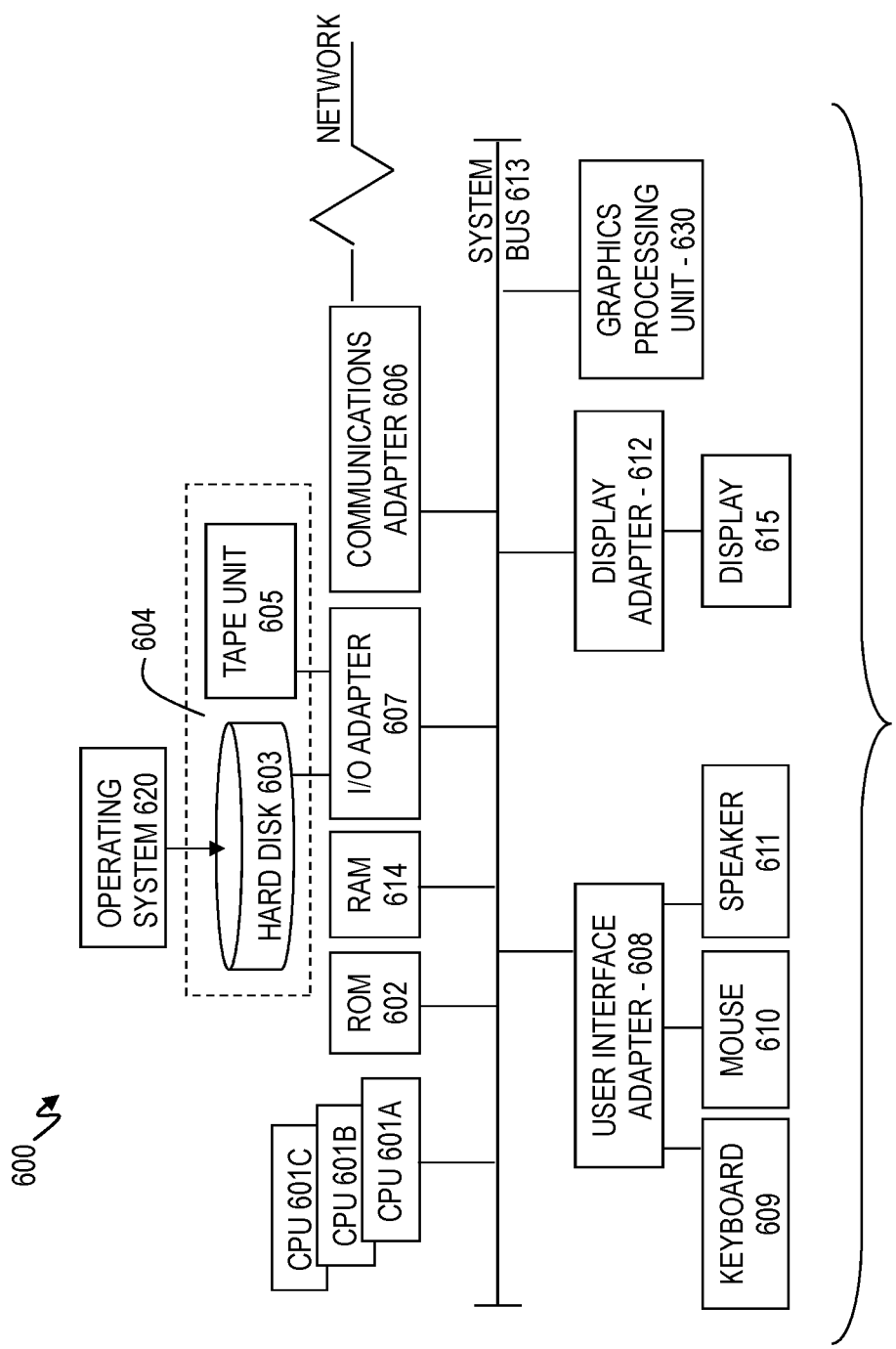
FIG. 6 depicts a computer/processing system having components and/or functionality for practicing one or more embodiments of the present invention.

FIG. 6 depicts exemplary components of a computer system 600 according to one or more embodiments of the present invention. Any of the elements and functionality of computer system 600 can be included in any of the elements in FIGS. 1-5 and 7. The computer system 600 is a processing system. The processing system 600 can include one or more central processing units (processors) 601A, 601B, 601C, etc. (collectively or generically referred to as processor(s) 601). In one or more embodiments, each processor 601 can include a reduced instruction set computer (RISC) microprocessor. Processors 601 are coupled to system memory 614 and various other components via a system bus 613. Read only memory (ROM) 602 is coupled to the system bus 613 and can include a basic input/output system (BIOS), which controls certain basic functions of processing system 600.

FIG. 6 further depicts an input/output (I/O) adapter 607 and a network adapter 606 coupled to the system bus 413. I/O adapter 607 can be a small computer system interface (SCSI) adapter that communicates with a hard disk 603 and/or tape storage drive 605 or any other similar component. I/O adapter 607, hard disk 603, and tape storage device 605 are collectively referred to herein as mass storage 604. Operating system 620 for execution on the processing system 600 can be stored in mass storage 604. The network adapter 606 interconnects bus 613 with an outside network, for example, network 540, enabling data processing system 600 to communicate with other such systems, for example, automobile onboard computer system 54N. A screen (e.g., a display monitor) 615 is connected to system bus 613 by display adaptor 612, which can include a graphics adapter to improve the performance of graphics intensive applications and a video controller. In one or more embodiments of the present invention, adapters 607, 606, and 612 can be connected to one or more I/O busses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 610, and speaker 611 all interconnected to bus 613 via user interface adapter 608, which can include, for example, a Super I/O chip integrating multiple device adapters into a single integrated circuit.

In exemplary embodiments, the processing system 600 includes a graphics processing unit 630. Graphics processing unit 630 is a specialized electronic circuit designed to manipulate and alter memory to accelerate the creation of images in a frame buffer intended for output to a display. In general, graphics processing unit 630 is very efficient at manipulating computer graphics and image processing and has a highly parallel structure that makes it more effective than general-purpose CPUs for algorithms where processing of large blocks of data is done in parallel.

Thus, as configured in FIG. 6, the processing system 600 includes processing capability in the form of processors 601, storage capability including system memory 614 and mass storage 604, input means such as keyboard 609 and mouse 610, and output capability including speaker 611 and display 615. In one implementation, a portion of system memory 614 and mass storage 604 collectively store an operating system coordinate the functions of the various components shown in FIG. 6.

FIG. 7 is a flowchart of a computer-implemented method 700 for vehicle operation according to embodiments of the present invention. At block 702, the advanced transmission control unit 302 is configured to determine (via processor 330) that at least one condition is met related to a vehicle 300. At block 704, the advanced transmission control unit 302 is configured to, in response to the at least one condition being met, query an occupant in the vehicle 300. For example, the advanced transmission control unit 302 is configured to generate a natural language output including a query. At block 706, the advanced transmission control unit 302 is configured to determine that an affirmative response (e.g., "yes") is received to the query from the occupant. At block 708, the advanced transmission control unit 302 is configured to downshift and/or cause a downshift of a transmission 306 of the vehicle 300 in response to the affirmative response.

The at least one condition includes future path characteristics for the vehicle 300. The future path characteristics include anticipated or present road slope, anticipated or present road material and driving surface, anticipated or present road slipperiness, anticipated or present traffic, anticipated or present weather, anticipated or present cornering, anticipated intersection, history of accidents, and history of slipping.

The query is audible and includes whether the downshift of the transmission 306 is desired because of the at least one condition. The query includes text and/or symbols asking/depicting whether the downshift of the transmission is desired because of the at least one condition. The query is audible and includes text, and asks whether the downshift of the transmission 306 is desired because of the at least one condition. The advanced transmission control unit 302 is configured to receive the affirmative response from an occupant of the vehicle via a user interface 310 prior to causing the downshift of the transmission 306 of the vehicle 300. The vehicle 300 is an autonomous vehicle; the query occurs while the autonomous vehicle is driving an occupant and the occupant is not participating in the driving.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for operating a vehicle, the method comprising: receiving, by a processor of the vehicle, a transmission setting related to at least one other vehicle having traveled along a same region as the vehicle; generating, by the processor, a natural language output comprising a query of whether to adjust a transmission of the vehicle to correspond to the transmission setting of the at least one other vehicle; determining, by the processor, that an affirmative response is obtained to the query to adjust the transmission of the vehicle to correspond to the transmission setting of the at least one other vehicle; and causing the transmission of the vehicle to be operatively controlled to correspond to the transmission setting of the at least one other vehicle, and wherein the vehicle is configured to query, a transmission control unit of the at least one other vehicle and in response to the query, determine that the transmission setting produced an unsafe ride for the at least one other vehicle, wherein the vehicle is configured to avoid the transmission setting that produced the unsafe ride for the at least one other vehicle.

2. The computer-implemented method of claim 1, further comprising determining that at least one external condition is met related to the vehicle; generating another query regarding controlling the transmission to shift from one gear to another gear, wherein the at least one external condition further comprises anticipated or present road slope; obtaining the affirmative response to the another query from an occupant; and causing a downshift of the transmission to be operatively performed by the vehicle in response to the affirmative response to the another query.

3. The computer-implemented method of claim 1, further comprising determining that at least one external condition is met related to the vehicle, wherein the at least one condition is related to a history of slipping.

4. The computer-implemented method of claim 1, further comprising determining that at least one external condition is met related to the vehicle; and generating another query, wherein: the another query is audible and comprises whether the downshift of the transmission is desired because of the at least one external condition; and the transmission is coupled to an engine, the transmission being functional in the vehicle and controlled in response to obtaining an affirmative response to the another query.

5. The computer-implemented method of claim 1, further comprising determining that at least one external condition is met related to the vehicle; and generating another query, wherein the at least one external condition comprises an anticipated intersection.

6. The computer-implemented method of claim 1, further comprising determining that at least one external condition is met related to the vehicle; and generating another query, wherein the another query: is audible and comprises text or symbols; and asks whether a downshift of the transmission is desired because of the at least one external condition.

7. The computer-implemented method of claim 1 further comprising obtaining the affirmative response from an occupant of the vehicle via a user interface prior to causing a downshift of the transmission of the vehicle.

8. The computer-implemented method of claim 1, wherein: the vehicle comprises an autonomous vehicle; and the query occurs while the autonomous vehicle is driving an occupant and the occupant is not participating in the driving.

9. The computer-implemented method of claim 1, further comprising determining that at least one external condition is met related to the vehicle; generating another query regarding controlling the transmission to shift from one gear to another gear, wherein the at least one external condition is selected from the group consisting of overtaking another vehicle or the another vehicle is tailgating; obtaining the affirmative response to the another query from an occupant; and causing a downshift of the transmission to be operatively performed by the vehicle in response to the affirmative response to the another query.

10. A computer program product for operating a vehicle, the computer program product comprising a computer readable storage medium having program instructions embodied therewith, the program instructions executable by a processor to cause the processor to perform operations comprising: receiving, by a processor of the vehicle, a transmission setting related to at least one other vehicle having traveled along a same region as the vehicle; generating, by the processor, a natural language output comprising a query of whether to adjust a transmission of the vehicle to correspond to the transmission setting of the at least one other vehicle; determining, by the processor, that an affirmative response is obtained to the query of whether to adjust the transmission of the vehicle to correspond to the transmission setting of the at least one other vehicle; and causing the transmission of the vehicle to be operatively controlled to correspond to the transmission setting of the at least one other vehicle, and wherein the vehicle is configured to query a transmission control unit of the at least one other vehicle and in response to the query determine that the transmission setting produced an unsafe ride for the at least one other vehicle, wherein the vehicle is configured to avoid the transmission setting that produced the unsafe ride for the at least one other vehicle.

11. The computer program product of claim 10, further comprising determining that at least one external condition is met related to the vehicle; generating another query regarding controlling the transmission to shift from one gear to another gear, wherein the at least one external condition further comprises one or more of future path characteristics for the vehicle, the future path characteristics comprising an anticipated or present road slipperiness; obtaining the affirmative response to the another query from an occupant; and causing a downshift of the transmission to be operatively performed by the vehicle in response to the affirmative response to the another query.

12. The computer program product of claim 10, further comprising determining that at least one external condition is met related to the vehicle; and generating another query, wherein: the another query is audible and comprises whether the downshift of the transmission is desired because of the at least one condition; and the transmission is coupled to an engine, the transmission being functional in the vehicle and controlled in response to obtaining an affirmative response to the another query.

13. The computer program product of claim 10, wherein the query comprises text or symbols asking whether a downshift of the transmission is desired.

14. The computer program product of claim 10, further comprising determining that at least one external condition is met related to the vehicle; and generating another query, wherein the another query: is audible and comprises text; and asks whether a downshift of the transmission is desired because of the at least one external condition.

15. The computer program product of claim 10 further comprising obtaining the affirmative response from an occupant of the vehicle via a user interface prior to causing a downshift of the transmission of the vehicle.

16. The computer program product of claim 10, wherein: the vehicle comprises an autonomous vehicle; and the query occurs while the autonomous vehicle is driving an occupant and the occupant is not participating in the driving.

17. A system for operating a vehicle comprising: a processor; and a computer readable storage medium storing comprising executable instructions that, when executed by the processor, cause the processor to perform operations comprising: receiving, by the processor of the vehicle, a transmission setting related to at least one other vehicle having traveled along a same region as the vehicle; generating, by the processor, a natural language output comprising a query of whether to adjust a transmission of the vehicle to correspond to the transmission setting of the at least one other vehicle; determining, by the processor, that an affirmative response is obtained to the query of whether to adjust the transmission of the vehicle to correspond to the transmission setting of the at least one other vehicle; and causing the transmission of the vehicle to be operatively controlled to correspond to the transmission setting of the at least one other vehicle, and wherein the vehicle is configured to query a transmission control unit of the at least one other vehicle and in response to the query determine that the transmission setting produced an unsafe ride for the at least one other vehicle, wherein the vehicle is configured to avoid the transmission setting that produced the unsafe ride for the at least one other vehicle.

18. The system of claim 17, further comprising determining that at least one condition is met related to the vehicle; generating another query regarding controlling the transmission to shift from one gear to another gear, wherein the at least one condition further comprises one or more future path characteristics for the vehicle, the future path characteristics comprising anticipated or present road slipperiness, and anticipated or present traffic; receiving the affirmative response to the another query from an occupant; and causing a downshift of the transmission to be operatively performed by the vehicle in response to the affirmative response to the another query comprises controlling the transmission to shift from one gear to another gear.

19. The system of claim 18, further comprising determining that at least one external condition is met related to the vehicle, wherein the at least one condition is related to a history of slipping.

20. The system of claim 17, further comprising determining that at least one condition is met related to the vehicle; and generating another query, wherein: the another query is audible and comprises whether a downshift of the transmission is desired because of the at least one condition; and the transmission is coupled to an engine, the transmission being functional in the vehicle in response to the affirmative response to the query.

* * * * *